(12) United States Patent
Miwa

(10) Patent No.: US 9,875,423 B2
(45) Date of Patent: Jan. 23, 2018

(54) IMAGE PICKUP APPARATUS THAT CALCULATES LIGHT AMOUNT CHANGE CHARACTERISTIC, ELECTRONIC APPARATUS, AND METHOD OF CALCULATING LIGHT AMOUNT CHANGE CHARACTERISTIC

(71) Applicant: CANON KABUSHIKI KAISHA, Tokyo (JP)

(72) Inventor: Kenji Miwa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/044,344

(22) Filed: Feb. 16, 2016

(65) Prior Publication Data

US 2016/0249003 A1 Aug. 25, 2016

(30) Foreign Application Priority Data

Feb. 20, 2015 (JP) ................. 2015-031506

(51) Int. Cl.
*H04N 5/228* (2006.01)
*G06K 9/46* (2006.01)
*H04N 5/235* (2006.01)

(52) U.S. Cl.
CPC ......... *G06K 9/4661* (2013.01); *H04N 5/2351* (2013.01); *H04N 5/2353* (2013.01); *H04N 5/2357* (2013.01)

(58) Field of Classification Search
CPC .. G06K 9/4661; H04N 5/2357; H04N 5/2353; H04N 5/2351

USPC ........................................... 348/222.1–229.1
See application file for complete search history.

(56) References Cited

U.S. PATENT DOCUMENTS

| 7,884,879 | B2 * | 2/2011 | Miyazaki | G03B 7/28 348/364 |
|---|---|---|---|---|
| 2008/0075382 | A1 * | 3/2008 | Sugeno | H04N 5/2357 382/270 |
| 2013/0113811 | A1 * | 5/2013 | Choi | G09G 3/3648 345/520 |
| 2013/0265482 | A1 * | 10/2013 | Funamoto | H04N 5/23212 348/349 |

FOREIGN PATENT DOCUMENTS

JP 2006222935 A 8/2006

* cited by examiner

*Primary Examiner* — Yogesh Aggarwal
(74) *Attorney, Agent, or Firm* — Rossi, Kimms & McDowell LLP

(57) ABSTRACT

An image pickup apparatus capable of calculating a light amount change characteristic of light from an object according to a state of the object. In the image pickup apparatus, the luminance change-based flicker detection for detecting flicker of a light source by calculating the light amount change characteristic of light from a photographing object based on sequential image data obtained by an image pickup device, and the luminance distribution-based flicker detection for detecting flicker by calculating the light amount change characteristic based on luminance distribution data generated from the image data are selectively performed according to the brightness of the photographing environment.

9 Claims, 11 Drawing Sheets

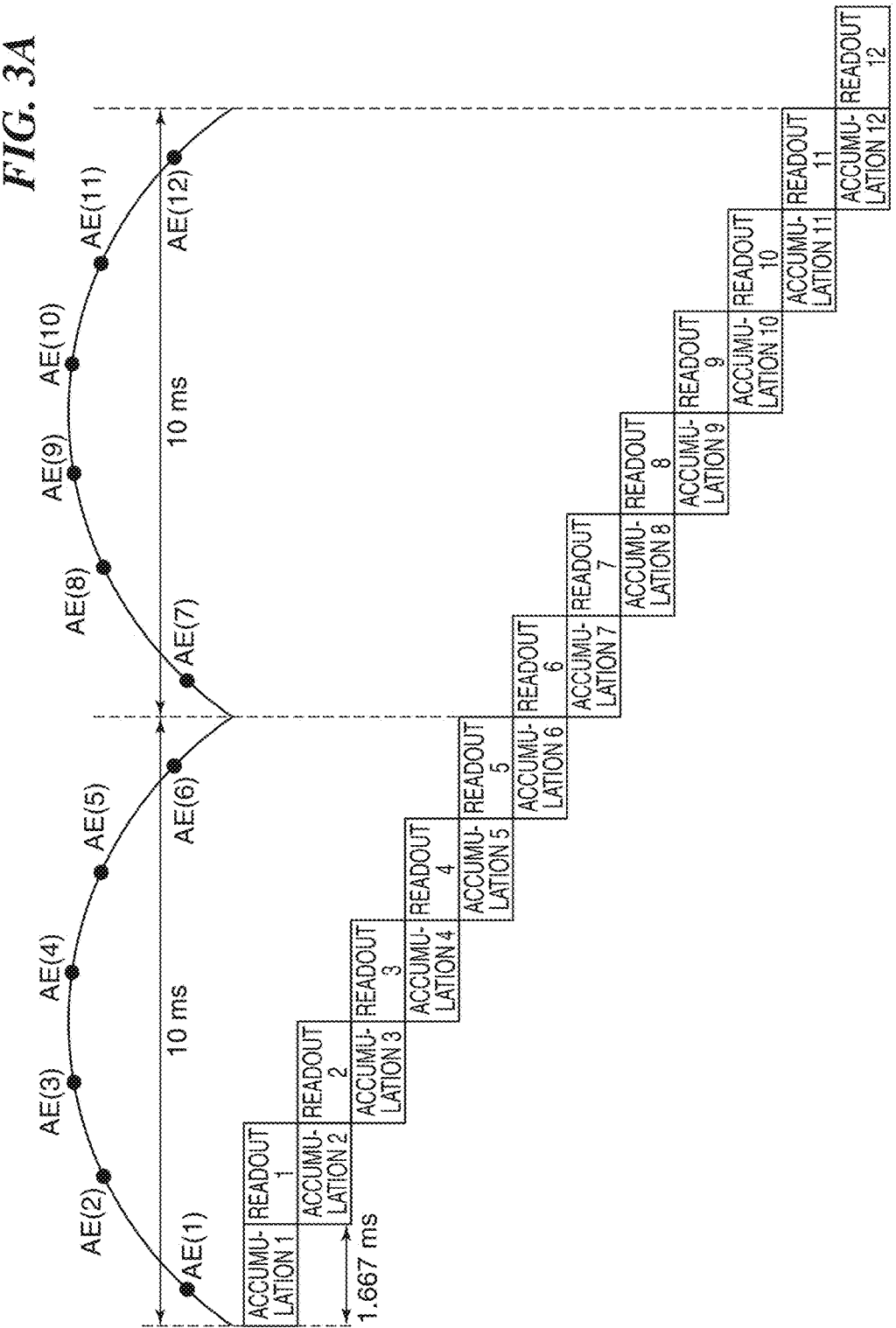

FIG. 3C

| NUMBER OF VERTICALLY ADDED PIXELS | READOUT TIME (1 V TIME) |
|---|---|
| 1 | 6.25 msec |
| 2 | 3.63 msec |
| 3 | 2.57 msec |
| 4 | 2.33 msec |
| 5 | 2.09 msec |
| 6 | 1.90 msec |
| 7 | 1.81 msec |
| 8 | 1.73 msec |
| 9 | 1.66 msec |
| 10 | 1.62 msec |

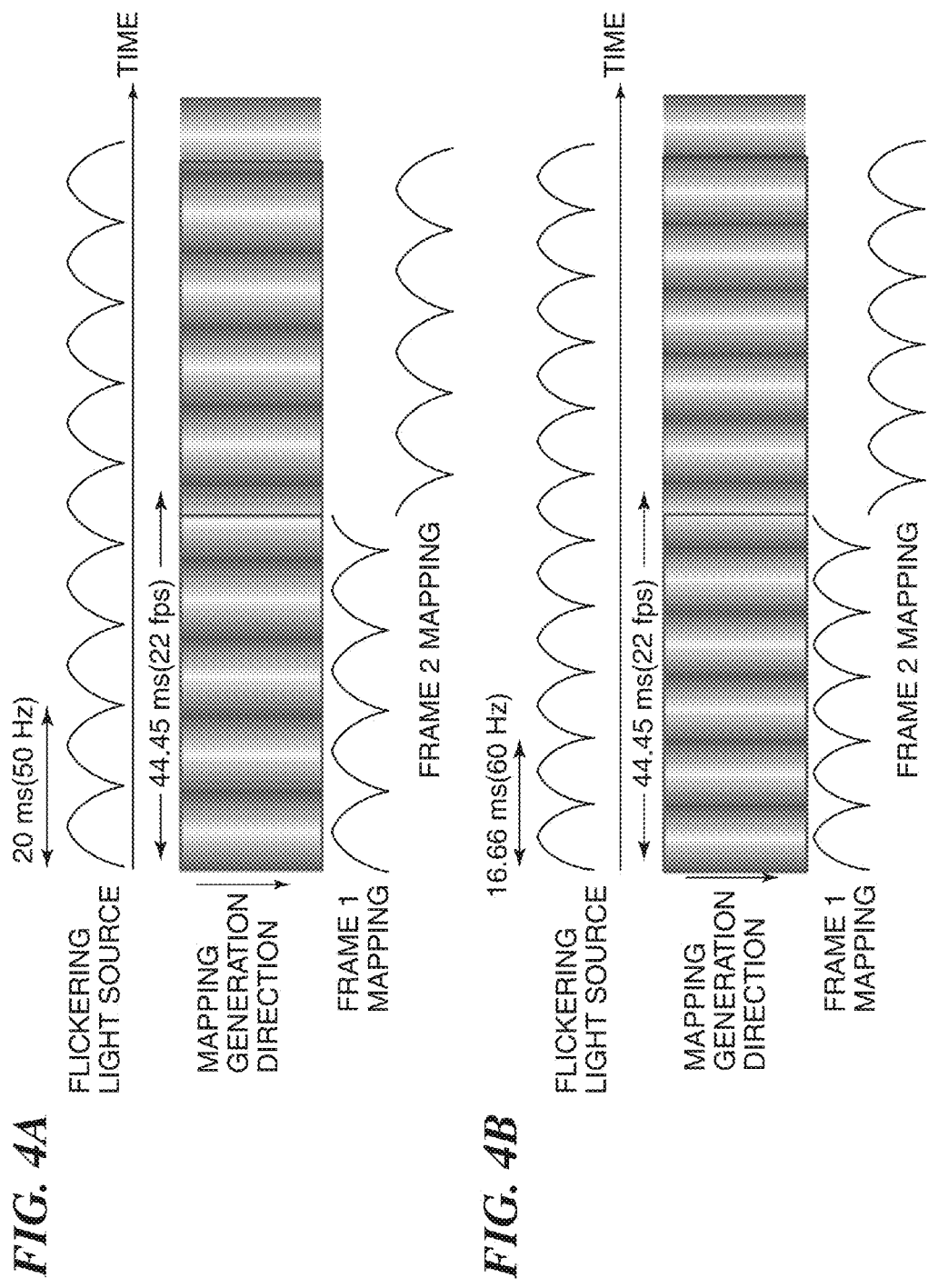

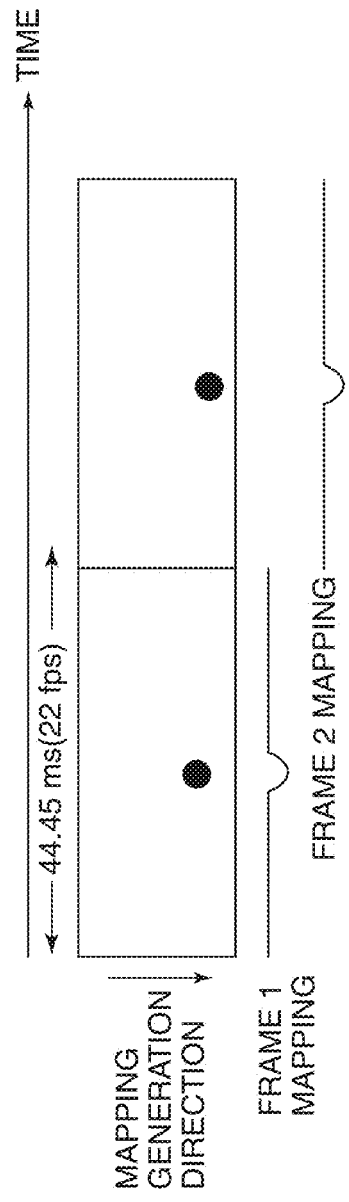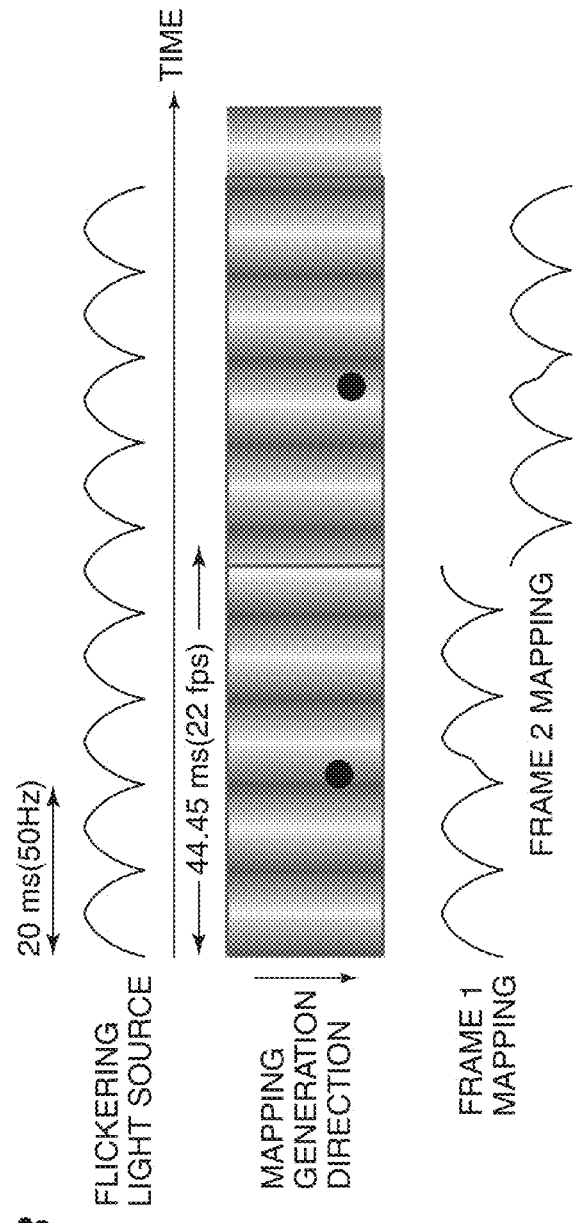

IMAGE PICKUP APPARATUS THAT CALCULATES LIGHT AMOUNT CHANGE CHARACTERISTIC, ELECTRONIC APPARATUS, AND METHOD OF CALCULATING LIGHT AMOUNT CHANGE CHARACTERISTIC

BACKGROUND OF THE INVENTION

Field of the Invention

The present invention relates to an image pickup apparatus, such as a digital camera, an electronic apparatus, and a method of calculating a light amount change characteristic of light from a photographing object.

Description of the Related Art

In recent years, image pickup apparatuses, such as a digital camera, have come to be equipped with an image pickup device improved in sensitivity. This has made it possible to photograph a picture without blurring at a high shutter speed even under a relatively dark environment, such as indoors. However, fluorescent lamps, which are widely used as indoor light sources, produce a phenomenon called flicker in which illumination light periodically fluctuates due to influence of the frequency of a power supply (in general, a commercial power supply). When image pickup is performed at high shutter speed under such a light source that produces flicker (hereinafter referred to as the "flickering light source"), exposure unevenness or color temperature variation of an image can be caused between frames due to the influence of flickering, and further, exposure unevenness and/or color unevenness sometimes occur(s) within one frame.

Further, image pickup apparatuses have become prevalent which are equipped with a live view function for sequentially displaying images periodically picked up by an image pickup device on a display section provided in the image pickup apparatus. Also in the live view function, in a case where the charge accumulation time period of each picked-up frame is short, exposure unevenness sometimes is caused within a frame due to the influence of flickering.

To solve this problem, in Japanese Patent Laid-Open Publication No. 2006-222935, there has been proposed a technique for detecting a state of flicker of illumination light, and adjusting the timing of image pickup such that the center of an exposure time substantially coincides with timing in which the light amount of the illumination light becomes a maximum value. Further, in Japanese Patent Laid-Open Publication No. 2006-222935, there has been proposed a technique for detecting an illuminance of the illumination light at sampling intervals of 1 msec, and detecting a blinking period of the illumination light based on a result of the detection of the illuminance.

However, in the method of detecting a state of flicker of illumination light, described in Japanese Patent Laid-Open Publication No. 2006-222935, the charge accumulation time period of a photoelectric conversion device used for the detection is limited. This causes a problem that under a condition of dark environmental light, erroneous detection of flicker is likely to occur. Further, also in a case where luminance variation is caused by a photographing object appearing in a photographing image, erroneous detection of flicker is likely to occur.

SUMMARY OF THE INVENTION

The present invention provides an image pickup apparatus that is capable of calculating a light amount change characteristic of light from an object according to a state of the object, an electronic apparatus, and a method of calculating a light amount change characteristic.

In a first aspect of the invention, there is provided a image pickup apparatus comprising an image pickup unit, a first calculation unit configured to calculate a light amount change characteristic of light from a photographing object based on sequential image data obtained by the image pickup unit, a second calculation unit configured to calculate the light amount change characteristic based on luminance distribution data generated from image data obtained by the image pickup unit, and a control unit configured to control whether to calculate the light amount change characteristic using the first calculation unit or calculate the light amount change characteristic using the second calculation unit according to a state of the photographing object.

In a second aspect of the invention, there is provided an electronic apparatus comprising a first calculation unit configured to calculate a light amount change characteristic of light from an object based on a plurality of photometric values obtained at intervals of a time period shorter than a predetermined time period, a second calculation unit configured to calculate the light amount change characteristic based on information on luminance changes within an image, which information is obtained by performing charge accumulation for each of areas such that start timing thereof is differentiated on an area-by-area basis, over a charge accumulation time period longer than the time period for obtaining each of the plurality of photometric values, and a control unit configured to control whether to calculate the light amount change characteristic using the first calculation unit or calculate the light amount change characteristic using the second calculation unit according to a state of the object.

In a third aspect of the invention, there is provided a method of calculating a light amount change characteristic, comprising performing image pickup, calculating a light amount change characteristic of light from a photographing object based on sequential image data obtained by the image pickup, calculating the light amount change characteristic based on luminance distribution data generated from image data obtained by the image pickup, and controlling whether to calculate the light amount change characteristic by said first-mentioned calculating or calculate the light amount change characteristic by said second-mentioned calculating according to a state of the photographing object.

In a fourth aspect of the invention, there is provided a method of calculating a light amount change characteristic, comprising calculating a light amount change characteristic of light from an object based on a plurality of photometric values obtained at intervals of a time period shorter than a predetermined time period, calculating the light amount change characteristic based on information on luminance changes within an image, which information is obtained by performing charge accumulation for each of areas such that start timing thereof is differentiated on an area-by-area basis, over a charge accumulation time period longer than the time period for obtaining each of the plurality of photometric values, and controlling whether to calculate the light amount change characteristic by said first-mentioned calculating or calculate the light amount change characteristic by said second-mentioned calculating according to a state of the object.

According to the image pickup apparatus of the present invention, it is possible to calculate a light amount change characteristic of light from an object according to a state of the object.

Further features of the present invention will become apparent from the following description of exemplary embodiments (with reference to the attached drawings).

BRIEF DESCRIPTION OF THE DRAWINGS

FIG. 3A is a diagram showing changes in charge accumulation in a photometric sensor and a photometric value output from the photometric sensor, which are used for luminance change-based flicker detection, in a case where a flickering light source is lighted by a power supply with a frequency of 50 Hz.

FIG. 3C is a diagram showing a relationship between the number of vertically added pixels and readout time in a CCD sensor.

FIG. 4A is a schematic diagram useful in explaining charge accumulation in an image pickup device for in-screen mapping-based flicker detection in a case where a flickering light source is lighted by a power supply with a frequency of 50 Hz.

FIG. 4B is a schematic diagram useful in explaining charge accumulation in the image pickup device for the in-screen mapping-based flicker detection in a case where a flickering light source is lighted by a power supply with a frequency of 60 Hz.

FIG. 6A is a schematic diagram useful in explaining an in-screen mapping acquired when a photographing object appears in frames in a photographing environment which is not under a flickering light source.

FIG. 6B is a schematic diagram useful in explaining an in-screen mapping acquired when a photographing object appears in frames in a photographing environment which is under a flickering light source.

DESCRIPTION OF THE EMBODIMENTS

The present invention will now be described in detail below with reference to the accompanying drawings showing embodiments thereof. Here, as an image pickup apparatus according to the present invention, a so-called digital camera is described by way of example. However, this is not limitative, but the present invention may be applied to various electronic apparatuses having a camera function. For example, the image pickup apparatus according to the present invention may be, for example, a mobile communication terminal which is equipped with the camera function, such as a mobile phone or a smartphone, a portable-type computer equipped with the camera function, and a portable video game machine equipped with the camera function.

Figure 1:
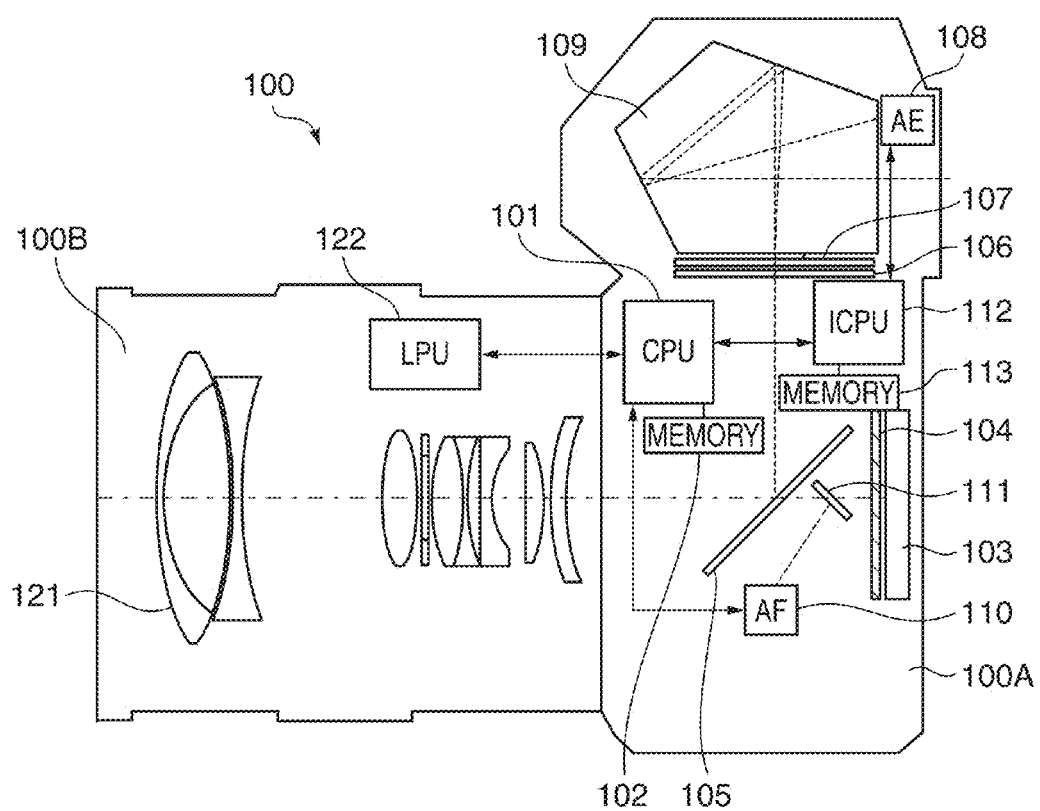
FIG. 1 is a schematic view of a digital camera as an image pickup apparatus according to an embodiment of the present invention.

FIG. 1 is a schematic view of a digital camera 100 as the image pickup apparatus according to an embodiment of the present invention. The digital camera 100 is generally comprised of a camera body 100A and a lens barrel 100B. The lens barrel 100B which is an image pickup optical system may be provided integrally with the camera body 100A, or may be provided removably from the camera body 100A. In the following description, calculation of a light amount change characteristic of light from an object is referred to as flicker detection.

The camera body 100A includes a CPU 101, a memory 102, an image pickup device 103, a shutter 104, a half mirror 105, a focusing plate 106, a display element 107, and a photometric (AE) sensor 108. Further, the camera body 100A includes a pentaprism 109, an optical finder, not shown, an AF sensor 110, an AF mirror 111, an ICPU 112, and a memory 113. The lens barrel 100B includes a plurality of lenses 121, a diaphragm, not shown, and an LPU 122.

The CPU 101 is a processing unit that controls the components of the digital camera 100. The memory 102 includes a ROM storing programs executed by the CPU 101, variables, etc., and a RAM having a work area into which the CPU 101 loads programs and a storage area for temporarily storing image data etc. The LPU 122 is a CPU provided in the lens barrel, which transmits e.g. distance information indicative of a distance from a photographing object, and further, performs driving control of the lenses 121 and so forth based on a command from the CPU 101. The image pickup device 103 is an image sensor comprised of a photoelectric conversion device, such as a CMOS image sensor, including an infrared cut filter, a low-pass filter, and so forth. The image pickup device 103 is used for not only normal image pickup, but also luminance distribution-based flicker detection in a first flicker detection process, described hereinafter, performed by the digital camera 100. Note that the definition of the luminance distribution-based flicker detection (in-screen mapping-based flicker detection) will be described hereinafter. The shutter 104 is closed to shield the image pickup device 103 from light when photographing is not performed, and is opened to guide incident light (light flux) having passed through the lens barrel 100B to the image pickup device 103 when photographing is performed.

The half mirror 105 disposed on a front side (photographing object side) of the image pickup device 103 reflects part of light incident through the lenses 121 when photographing is not performed to thereby cause an optical image to be formed on the focusing plate 106. The display element 107 displays an AF ranging frame e.g. of a PN (polymer network) liquid crystal, to thereby indicate a point of a photographing object for which AF control is performed, to a photographer (user) through the optical finder. The photometric sensor 108 is formed by a photoelectric conversion device, such as a CCD sensor or a CMOS sensor, and performs photometry with respect to a field for exposure control to thereby measure the brightness (luminance) of a photographing object. Note that in a third flicker detection process, described hereinafter, which is performed by the digital camera 100, luminance change-based flicker detection etc. are performed using an output signal from the photometric sensor 108. Note that the definition of the luminance change-based flicker detection will be described hereinafter.

The pentaprism 109 guides an image of the photographing object formed on the focusing plate 106 to the photometric sensor 108 and the optical finder. Note that the photometric sensor 108 views the image of the photographing object formed on the focusing plate 106 from a position in an oblique direction with respect to the optical finder through the pentaprism 109. The AF mirror 111 guides part of a light flux which has entered through the lens barrel 100B and has passed the half mirror 105, to the AF sensor 110. The AF sensor 110 measures a distance for automatic focusing with respect to the photographing object based on the received light flux.

The ICPU 112 is a CPU that controls driving of the photometric sensor 108, and performs various arithmetic processing operations, such as photometric calculation, photographing object recognition processing including face detection calculation and tracking calculation, and flicker detection calculation. The memory 113 includes a ROM storing programs executed by the ICPU 112, variables, and so forth, and a RAM having a work area into which the ICPU 112 loads programs and a storage area for temporarily storing calculation results.

Although not shown, the digital camera 100 includes a power switch and a shutter switch. The shutter switch includes a first switch which is turned on by half-pressing the shutter switch (first stroke) and a second switch which is turned on by fully pressing the shutter switch (second stroke). When the first switch is turned on, exposure control based on an output from the photometric sensor 108 and automatic focusing control based on an output from the AF sensor 110 are performed. Further, when the second switch is turned on, actual photographing is performed. In the actual photographing, an optical image formed on the image pickup device 103 is converted to analog electric signals by the image pickup device 103, and the analog electric signals are converted to digital image data by an image processor, not shown, which is stored in a storage section, such as a memory card, not shown.

Figure 2:
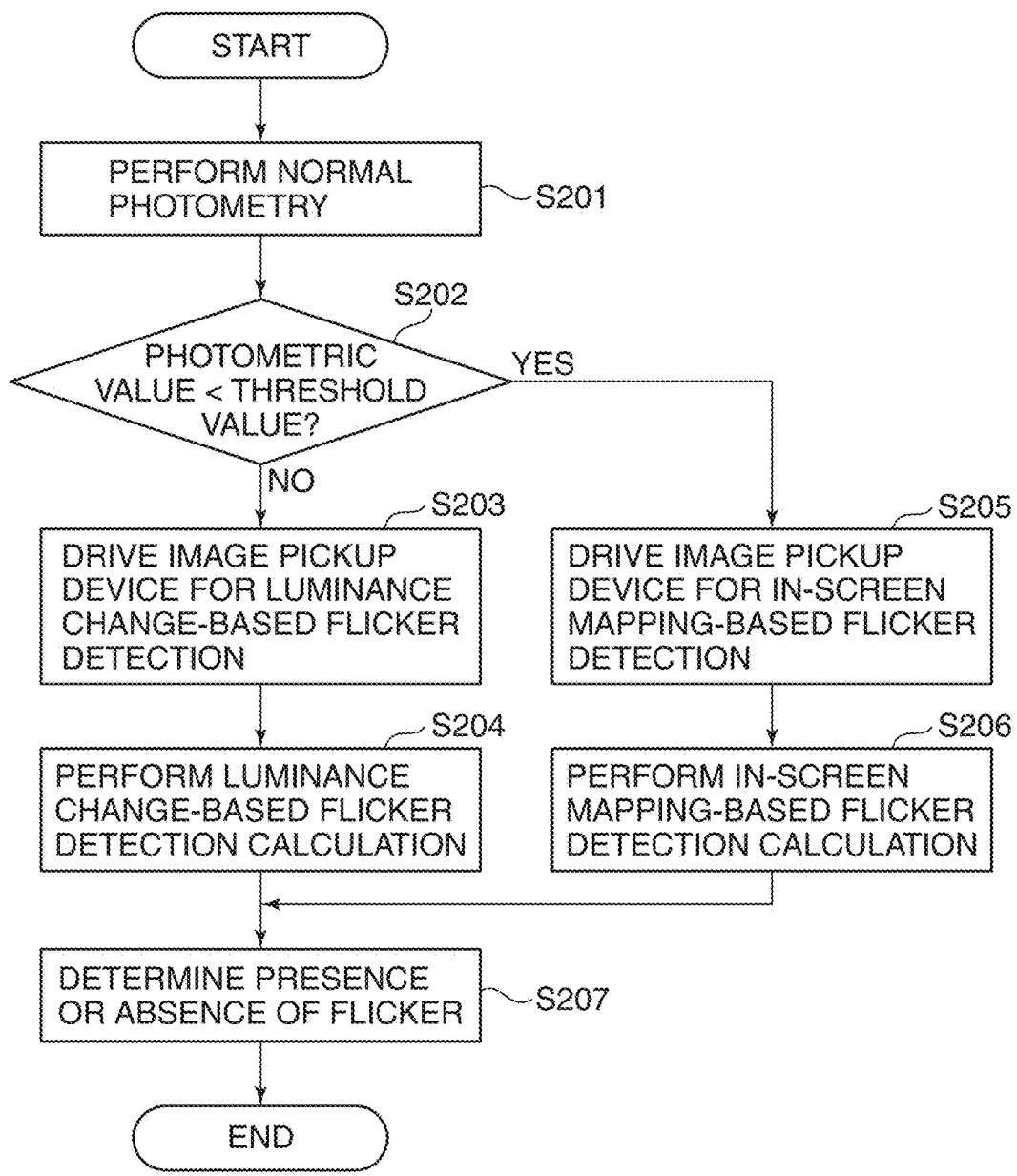
FIG. 2 is a flowchart of a first flicker detection process performed by the digital camera.

FIG. 2 is a flowchart of the first flicker detection process performed by the digital camera 100. The processing steps in FIG. 2 are realized by the CPU 101 that controls the operations of the components of the digital camera 100 by loading programs stored in the ROM of the memory 102 into the RAM. Note that the first flicker detection process shown in FIG. 2 includes processing practically performed by the ICPU 112 under the control of the CPU 101, and such processing will be described as processing executed by the ICPU 112.

To perform flicker detection when image pickup is performed, acquisition of the brightness of the photographing environment is required. This is because unless the brightness of the photographing environment is acquired, it is impossible to properly set a charge accumulation time period and a gain for driving the image pickup device 103. For this reason, in a step S201, the ICPU 112 under the control of the CPU 101 performs an operation of normal photometry using the photometric sensor 108 to thereby detect the brightness of the photographing environment. The ICPU 112 performs photometric calculation based on an output signal obtained from the photometric sensor 108, and notifies the CPU 101 of a result of the calculation by inter-CPU communication such as serial communication. The method of photometric calculation is not particularly limited, but, for example, a photometric value may be obtained by dividing an image pickup area obtained from the photometric sensor 108 into a plurality of areas, and subjecting an image signal detected from each divided area to a weighted calculation using a weight assigned for each area.

In the following step S202, the CPU 101 compares the photometric value obtained in the step S201 with a predetermined threshold value, and determines whether or not the photometric value is larger than the threshold value. This determination is performed for the following reason: Although the luminance change-based flicker detection is performed in steps S203 and S204, in driving the image pickup device 103 in a case where the luminance change-based flicker detection is performed, a long charge accumulation time period cannot be set. Therefore, if the luminance change-based flicker detection is performed in an environment under the dark environmental light, erroneous detection is likely to occur. To cope with this, a photometric value (the aforementioned threshold value) corresponding to a luminance below which erroneous detection is likely to occur in the luminance change-based flicker detection is determined in advance, and whether to perform the luminance change-based flicker detection or the in-screen mapping-based flicker detection is determined based on a result of comparison between a result of normal photometry and the threshold value.

Note that the luminance change-based flicker detection is processing for detecting flicker of a light source by calculating the light amount change characteristic of light from an object based on a plurality of photometric values obtained at intervals of a time period shorter than a predetermined time period. Further, the in-screen mapping-based flicker detection is processing for detecting flicker of a light source by calculating the light amount change characteristic of light from an object based on information on luminance changes within an image, which information is obtained by performing charge accumulation for each of areas such that start timing thereof is differentiated on an area-by-area basis, over a charge accumulation time period longer than the time period for obtaining each of the plurality of photometric values.

If the photometric value is not smaller than the threshold value (NO to the step S202), the CPU 101 proceeds to the step S203, whereas if the photometric value is smaller than the threshold value (YES to the step S202), the CPU 101 proceeds to a step S205.

In the steps S203 and S204 which are executed when the environmental light is not dark, the CPU 101 performs the luminance change-based flicker detection. In the step S203, the CPU 101 drives the image pickup device 103 in a driving mode for the luminance change-based flicker detection. Now, the driving mode of the image pickup device 103 for the luminance change-based flicker detection will be described with reference to FIGS. 3A to 3C.

Figure 3B:
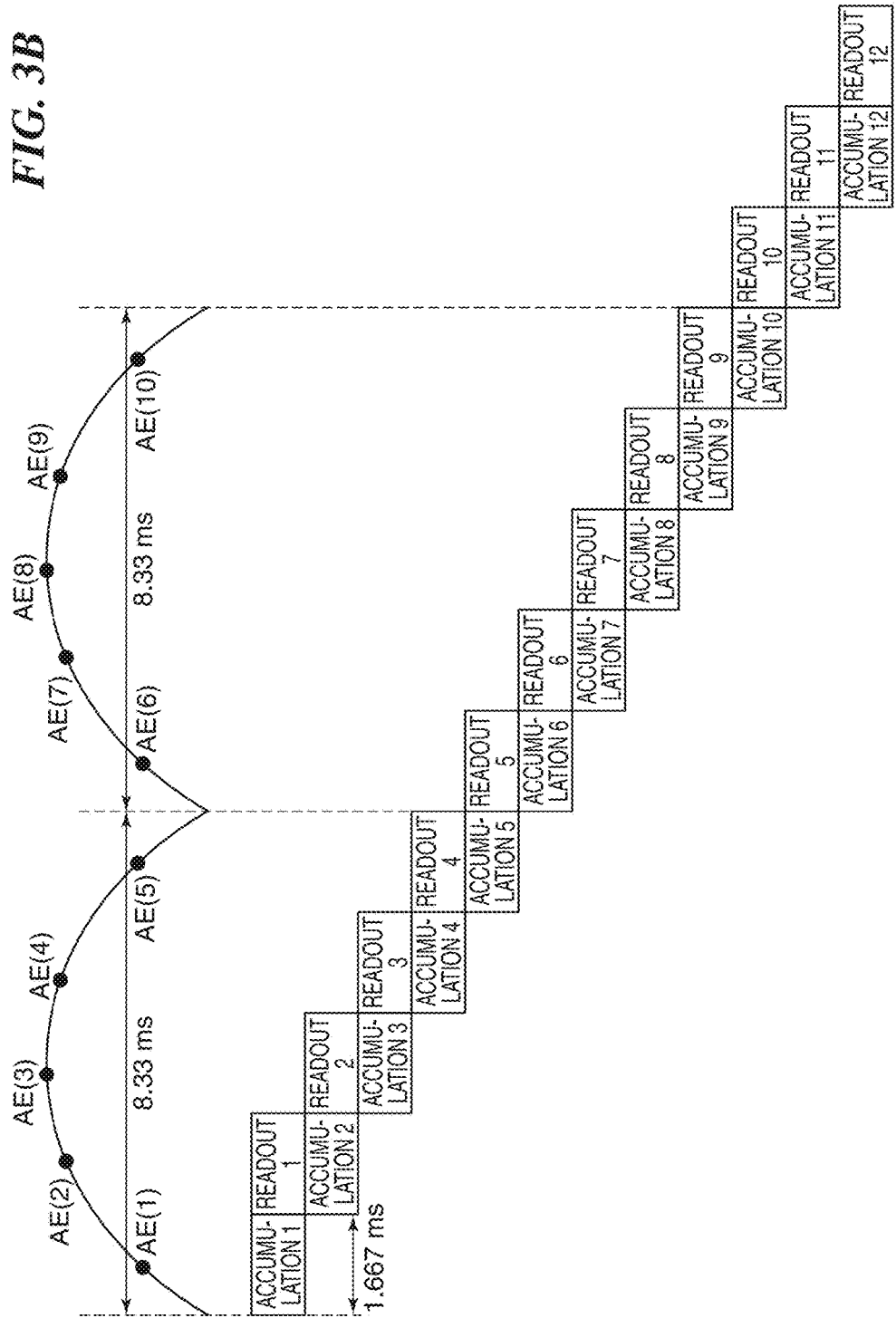
FIG. 3B is a diagram showing changes in charge accumulation in the photometric sensor and a photometric value output from the photometric sensor, which are used for the luminance change-based flicker detection, in a case where a flickering light source is lighted by a power supply with a frequency of 60 Hz.

FIGS. 3A and 3B are diagrams showing changes in charge accumulation of the image pickup device 103 performed for the luminance change-based flicker detection with respect to respective flickering light sources lighted by power supplies with frequencies of 50 Hz and 60 Hz, and respective output photometric values. In the luminance change-based flicker detection, to detect flicker, as shown in FIGS. 3A and 3B, charge accumulation and readout are continuously performed twelve times at a repetition period of approximately 600 fps (=approximately 1.667 ms). This repetition period of 600 fps is a common multiple of possible expected frequencies (100 Hz and 120 Hz) of a flickering light source. Therefore, the charge accumulation time period of image pickup for obtaining sequential image data in the luminance change-based flicker detection is shorter than 1/120 sec (predetermined time period) which is the shorter one of possible expected repetition periods of change in the light amount of a flickering light source. Note that the frequency of change between brightness and darkness of the flickering light source is twice the power supply frequency, and hence the frequency becomes equal to 100 Hz in a region where the frequency of the commercial power supply is 50 Hz, and becomes equal to 120 Hz in a region where the frequency of the commercial power supply is 60 Hz.

In the luminance change-based flicker detection, one set of sequential image data items can be acquired in 20 msec (=1.667 msec×12), and hence it is possible to realize high-speed flicker detection. Therefore, in the present embodiment, the luminance change-based flicker detection is shorter in time required to perform flicker detection than the in-screen mapping-based flicker detection, described hereinafter, and hence the execution priority is given to the luminance change-based flicker detection.

Now, a description will be given of a method of driving the image pickup device 103 at approximately 600 fps.

For example, to drive (read out) all pixels of the image pickup device 103 having the number of pixels not less than QVGA at a frame rate not lower than approximately 600 fps, for example, a method of increasing the driving frequency and a method of arranging a plurality of A/D converters can be envisaged. However, these methods complicate the circuit configuration and hence increase the manufacturing costs, and further, they are not technically easy to perform. To cope with this, in the present embodiment, when performing face detection and photographing object tracking, all pixels are read out over a longer time period (at a frame rate lower than approximately 600 fps), and when performing the flicker detection, the pixels are read out by pixel addition readout or thinning-out readout, whereby the frame rate is adjusted to be at approximately 600 fps.

Assuming that the image pickup device 103 is a CCD sensor, it is generally impossible for the CCD sensor to perform partial readout of pixels, and hence it is only required that the image pickup device 103 is driven at a high speed by pseudo reduction of the number of readout lines through pixel addition. FIG. 3C is a diagram showing a relationship between the number of vertically added pixels and readout time in the CCD sensor. For example, by performing vertical pixel addition in a sensor with a striped pixel arrangement, it is possible to reduce the readout time (1 vertical scanning time period, namely, 1 V time period) as shown in FIG. 3C. In a case of the image pickup device 103 shown in FIG. 3C, it is possible to adjust the frame rate to be at approximately 600 fps by adding nine pixels in the vertical direction, and an image obtained in this case corresponds to an image obtained by reducing the number of pixels in the vertical direction to 1/9.

On the other hand, assuming that the image pickup device 103 is a CMOS sensor, it is relatively easy for the CMOS sensor to perform partial readout of pixels, and hence the image pickup device 103 can be driven such that the sum of charge accumulation time and pixel readout time is adjusted to be equal to approximately 1.667 msec, by thinning-out readout.

Referring again to FIG. 2, when driving (charge accumulation and pixel readout) of the image pickup device 103 for the luminance change-based flicker detection is terminated in the step S203, the ICPU 112 performs luminance change-based flicker detection calculation in the step S204, and notifies the CPU 101 of a result of the calculation. In each of FIGS. 3A and 3B, a n-th accumulation is indicated by "accumulation n", readout of "accumulation n" is indicated by "readout n", and a photometric value obtained by a result of "readout n" is indicated by "AE (n)". Charge accumulation is performed in a finite time, and hence a time at which each photometric value is acquired is represented by a center value in the accumulation time period.

The flicker emission repetition period in the case where the frequency of the commercial power supply is 50 Hz is approximately 10 msec, which gives 10/1.667≈6, and hence as shown in FIG. 3A, the same photometric value is obtained at intervals of six repetition periods independently of accumulation timing. That is, a relationship of AE (n)=AE (n+6) holds. Similarly, the flicker emission repetition period in the case where the frequency of the commercial power supply is 60 Hz is approximately 8.33 msec, which gives 8.33/1.667≈5, and hence as shown in FIG. 3B, the same photometric value is obtained at intervals of five repetition periods independently of accumulation timing. Therefore, a relationship of AE (n)=AE (n+5) holds. On the other hand, under an environment without occurrence of flicker, AE (n) is constant irrespective of n.

An evaluation value F50 calculated for use in combination with an evaluation value F60, mentioned below, in determining that the photographing environment is under a flickering light source with a power supply frequency of 50 Hz, and the evaluation value F60 calculated for use in combination with the evaluation value F50, mentioned above, in determining that the photographing environment is under a flickering light source with a power supply frequency of 60 Hz are defined by the following equations (1) and (2):

$$F50 = \Sigma_{i=1}^{6} |AE(n) - AE(n+6)| \quad (1)$$

$$F60 = \Sigma_{i=1}^{5} |AE(n) - AE(n+5)| \quad (2)$$

In this case, using a predetermined threshold value F_th, if "F50<F_th and also F60<F_th" hold, it is possible to determine absence of flicker (the photographing environment is not under a flickering light source). Further, if "F50<F_th and F60≥F_th" hold, it is possible to determine that the photographing environment is under the flickering light source with a power supply frequency of 50 Hz. Furthermore, if "F50≥F_th and F60<F_th" hold, it is possible to determine that the photographing environment is under the flickering light source with a power supply frequency of 60 Hz. After execution of the step S204, the CPU 101 proceeds to a step S207.

In the step S205 and a step S206 which are executed when the environmental light is dark, the CPU 101 performs the in-screen mapping-based flicker detection. In the step S205, the CPU 101 drives the image pickup device 103 in a driving mode for the in-screen mapping-based flicker detection, and acquires luminance distribution data (mapping data). Here, the in-screen mapping-based flicker detection will be described.

FIGS. 4A and 4B are schematic diagrams useful in explaining charge accumulation in the image pickup device 103 performed for the in-screen mapping-based flicker detection, with respect to respective flickering light sources lighted by power supplies with frequencies of 50 Hz and 60 Hz.

In the in-screen mapping-based flicker detection, the image pickup device 103 is driven at 22 fps in a mirror-up state where the half mirror 105 is lifted so as to cause an image of light incident through the lens barrel 100B to be formed on the image pickup device 103, whereby image data is acquired. When the image pickup device 103 is driven at 22 fps, the processing time per frame is 1000/22≈44.45 msec. Therefore, the charge accumulation time period of image pickup for obtaining the in-screen mapping data in the in-screen mapping-based flicker detection is longer than a time period of 1/100 sec which is the longer one of the possible expected repetition periods of change in the light amount of a flickering light source.

Note that the charge accumulation time period indicates a time period from the start of charge accumulation in an area of the image pickup device 103, where charge accumulation is started first, to the end of charge accumulation in an area of the same, where charge accumulation is started last, and is approximately equal to the processing time per frame. Further, if the charge accumulation time period of the image pickup device 103 is too short, exposure unevenness is less likely to appear, and hence it is desirable to set a length of the charge accumulation time period by providing a lower limit value (e.g. 1/600 sec). Also, exposure unevenness is less likely to appear if the charge accumulation time period of the image pickup device 103 is too long, and hence a length of the charge accumulation time period may be set by providing an upper limit value (e.g. 1/30 sec). Further, in a case where the charge accumulation time period of the image pickup device 103 is a multiple of 1/100 sec or a multiple of 1/120 sec, the charge accumulation time period is equal to an integer multiple of one repetition period of change in the light amount of the flickering light source, which sometimes makes exposure unevenness difficult to appear. Therefore, the charge accumulation time period of the image pickup device 103 may be set to a charge accumulation time period which is within a range between the above-mentioned upper limit value and lower limit value, and is different from a multiple of 1/100 sec and a multiple of 1/120 sec. The charge accumulation time period may be a charge accumulation time period set in advance or a charge accumulation time period set according to the photographing environment, insofar as these conditions are satisfied.

The light emission period of the flickering light source using the commercial power supply with a frequency of 50 Hz is approximately 10 msec, which gives 44.45/10≈4.45. Further, the image pickup device 103 is a photoelectric conversion device, such as a CMOS sensor, which is controlled by differentiating the start timing and the end timing of charge accumulation, on a line-by-line basis. Therefore, as shown in FIG. 4A, when an image data item of a first frame (frame 1) and an image data item of a second frame (frame 2) are sequentially acquired, exposure unevenness appearing in the first frame due to flicker and exposure unevenness appearing in the second frame due to flicker are inverted in phase. As described above, since the image pickup device 103 is controlled by differentiating the start timing and the end timing of charge accumulation, in the image data item in which stripe-like exposure unevenness, as shown in FIG. 4A, appears, a time axis direction corresponds to a vertical direction of the image pickup device 103, and a mapping generating direction corresponds to a horizontal direction of the image pickup device 103. That is, when the image pickup device 103 is driven at 22 fps, image data in which horizontal stripes appear is generated.

Similarly, the light emission period of the flickering light source using the commercial power supply with a frequency of 60 Hz is approximately 8.33 msec, which gives 44.45/8.33≈5.46. Therefore, as shown in FIG. 4B, when an image data item of the first frame and an image data item of the second frame are sequentially acquired, exposure unevenness appearing in the first frame due to flicker and exposure unevenness appearing in the second frame due to flicker are inverted in phase.

In the step S205, the CPU 101 generates a mapping in the horizontal direction (mapping generation direction), and acquires mapping data in the time axis direction as luminance distribution data, for each frame thus acquired. The mapping data is data in which representative values calculated for the lines of the image pickup device 103, on a line-by-line basis, are arranged in the time axis direction, and a method of calculating each representative value is not particularly limited insofar as it is a method of calculating the representative value in such a manner that a change in the representative value within a frame correspond to a change in the light amount of the flickering light source. For example, the representative value is an average value calculated by averaging pixel signals of pixels included in each line, or an integrated value calculated by integrating the same. Next, in the step S206, the CPU 101 performs in-screen mapping-based flicker detection calculation using the in-screen mapping data acquired in the step S205. In the in-screen mapping-based flicker detection calculation, the mapping data of the first frame is divided by the mapping data of the second frame such that the maximum value and the minimum value of the mapping data become larger. This is because since images are picked up at the frame rate at which the phases of the maps of the first and second frames are inverted, and hence it is possible to more emphasize the mapping data by this division, which facilitates determination of exposure unevenness due to flicker. By calculating the maximum value and the minimum value of the mapping data thus emphasized and a repetition period of their appearance, it is possible to determine the presence or absence of flicker (whether or not the amount of light from an object periodically changes) and the repetition period of flicker (power supply frequency of the flickering light source (50 Hz or 60 Hz)).

After execution of the step S204 or S206, the CPU 101 proceeds to the step S207. In the step S207, the CPU 101 determines the presence or absence of flicker based on the result of determination in the step S204 or S206. That is, since one of a result of the luminance change-based flicker detection calculation in the step S204 and a result of the in-screen mapping-based flicker detection calculation result in the step S206 has been obtained, the CPU 101 determines the presence or absence of flicker in the photographing environment of the digital camera 100 based on the obtained result of the flicker detection calculation.

As described above, in the first flicker detection process performed by the digital camera 100, the luminance change-based flicker detection and the in-screen mapping-based flicker detection are switched according to the brightness of the photographing environment, and the presence or absence of flicker in the photographing environment is detected. This makes it possible to calculate the light amount change characteristic of light from an object according to the state of the object, and thereby enhance the accuracy of flicker detection while realizing high-speed flicker detection.

Figure 5A:
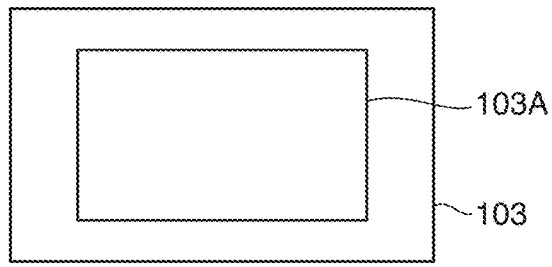
FIG. 5A is a diagram useful in explaining a luminance evaluation value acquisition area in the image pickup device, which is used in a second flicker detection process performed by the digital camera.

Next, a description will be given of a second flicker detection process performed by the digital camera 100. FIG. 5A is a diagram useful in explaining a luminance evaluation value acquisition area 103A in the image pickup device, which is used in the second flicker detection process performed by the digital camera 100.

The luminance evaluation value acquisition area 103A is an area for calculating a change in luminance, and is set to part of an area of the image pickup device 103 where image pickup is possible (in the present example, an area except an outer peripheral portion). One of the reasons for this is that as the number of pixels is larger, the time required for calculation of the luminance becomes longer, and hence it is necessary to set the number of pixels which can be processed within a time period allowable as time taken to perform the calculation. Further, when an image of light incident through the lens barrel 100B is formed on the image pickup device 103, light having obliquely entered pixels distant from the optical axis does not reach photo diodes which are two-dimensionally arranged and hence is shaded, which results in image data having a low peripheral luminance. Therefore, another of the reasons is that it is desired to calculate a more accurate luminance evaluation value by calculating the luminance evaluation value in an area except the part which is reduced in the peripheral light amount.

Figure 5B:
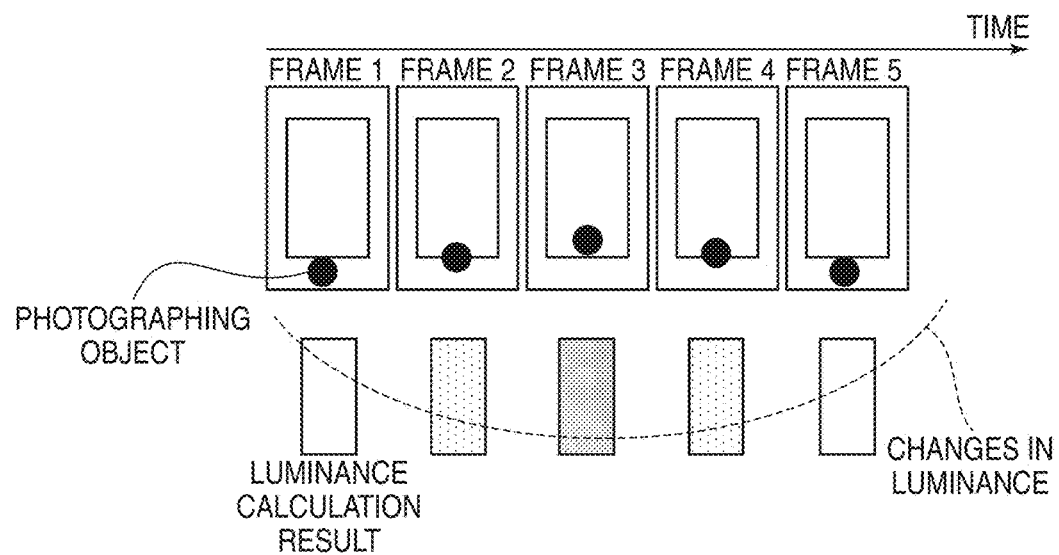
FIG. 5B is a diagram useful in explaining changes in the luminance evaluation value detected when a photographing object appears in the area for acquiring the luminance evaluation value.

FIG. 5B is a diagram useful in explaining changes in the luminance evaluation value detected when a photographing object appears in the luminance evaluation value acquisition area 103A. In a case where the luminance change-based flicker detection is performed using the image pickup device 103 in which the luminance evaluation value acquisition area 103A is set as shown in FIG. 5A, the amount of appearance of the photographing object in the luminance evaluation value acquisition area 103A sometimes changes with the lapse of time as shown in FIG. 5B. In this case, as a range of area in which the photographing object appears becomes larger, the value of the luminance evaluation value becomes smaller, and as a result, the luminance calculation results in an evaluation that the luminance becomes gradually darker. Further, as the range of area in which the photographing object appears becomes smaller, the luminance evaluation value becomes larger, and as a result, the luminance calculation results is an evaluation that the luminance becomes gradually brighter. Therefore, the luminance is evaluated such that the luminance changes according to a change in the amount of appearance of the photographing object, and this may cause erroneous detection that a change in the luminance, which is not caused by flicker, is determined as that caused by flicker.

FIG. 6A is a schematic diagram useful in explaining an in-screen mapping acquired when a photographing object appears in frames in a photographing environment which is not under a flickering light source. In the respective frame mappings of the frames 1 and 2, although the mapping data of part in which the photographing object appears changes, exposure unevenness due to flicker is not found in the mapping data obtained by dividing the mapping data item of frame 1 by the mapping data item of frame 2, in which the maximal and minimum values are emphasized, and hence it is not determined that flicker is present.

On the other hand, FIG. 6B shows an in-screen mapping acquired when a photographing object appears in frames in a photographing environment under a flickering light source lighted by a power supply with a frequency of 50 Hz. The influence of the photographing object appears in each of the mapping data items of frame 1 and frame 2, and exposure unevenness due to flicker remains in an emphasized manner in the mapping data obtained by dividing the mapping data item of frame 1 by the mapping data item of frame 2. As a result, it is possible to detect that the photographing environment is under the flickering light source. Therefore, in the second flicker detection process, flicker detection is performed by making use of a difference between FIGS. 6A and 6B.

Figure 7:
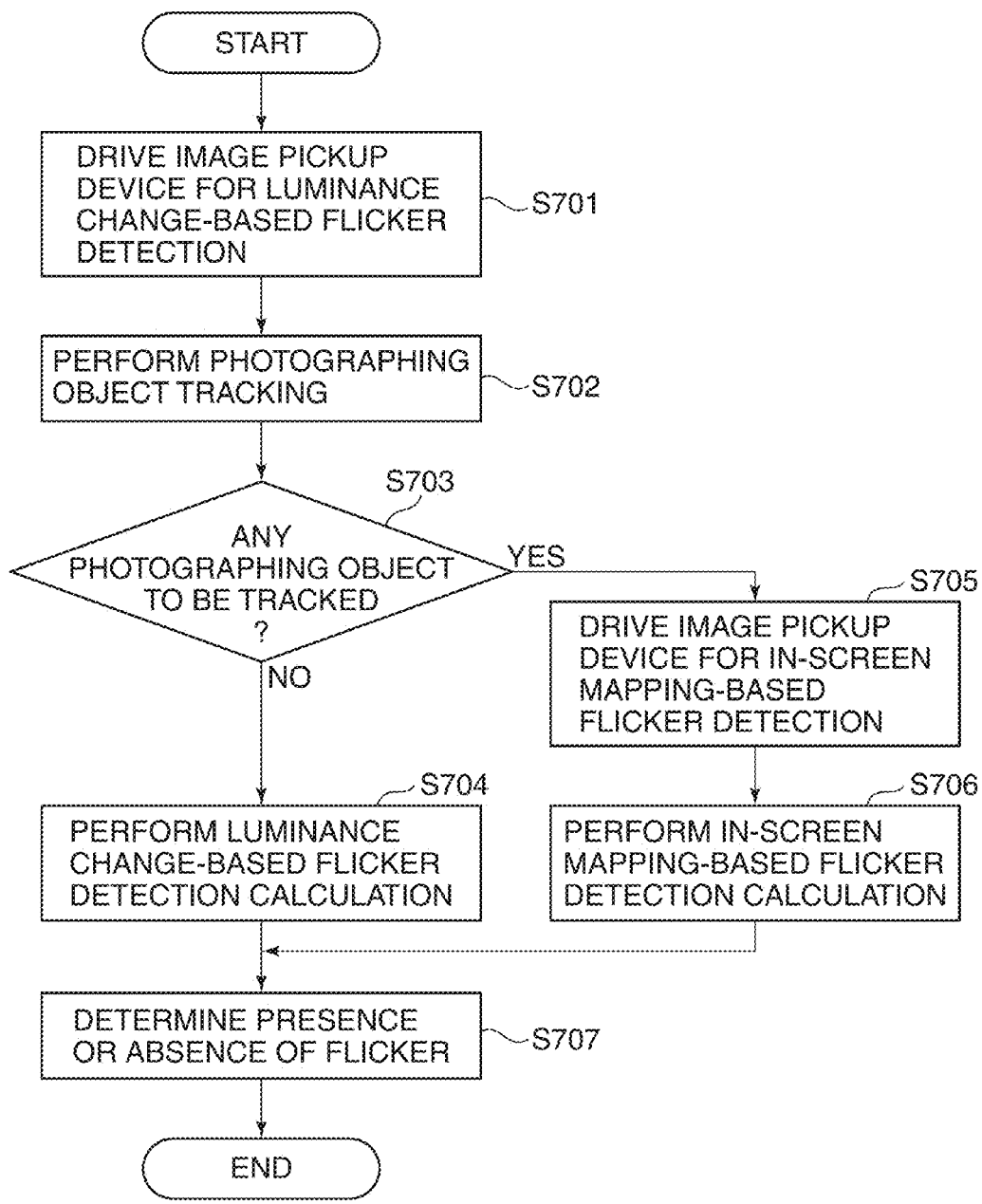
FIG. 7 is a flowchart of the second flicker detection process performed by the digital camera.

FIG. 7 is a flowchart of the second flicker detection process performed by the digital camera. The processing steps in FIG. 7 are realized by the CPU 101 that controls the operations of the components of the digital camera 100 by loading programs stored in the ROM into the RAM.

In a step S701, the CPU 101 drives the image pickup device 103 in the driving mode for the luminance change-based flicker detection to thereby accumulate electric charges. The details of the processing in the step S701 is the same as those in the step S203 in FIG. 2, and hence description thereof is omitted. In the following step S702, the CPU 101 performs a photographing object-tracking process so as to detect a state of appearance of a photographing object from image data accumulated for the luminance change-based flicker detection.

Figure 8:
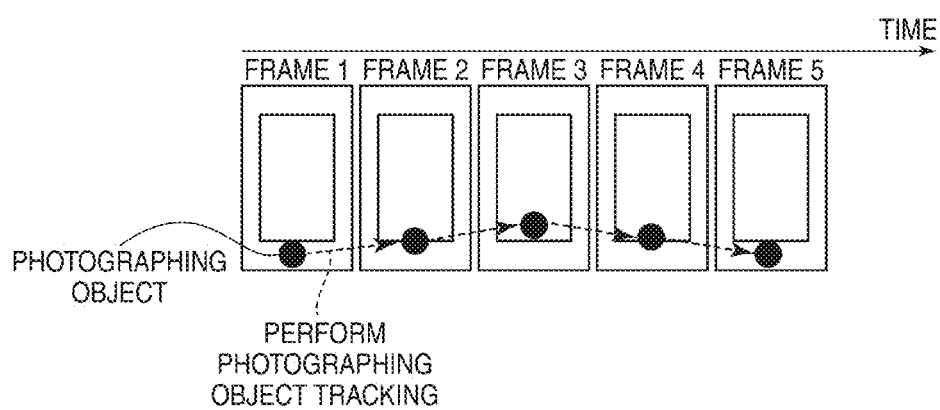
FIG. 8 is a schematic diagram which is useful in explaining a photographing object-tracking process in a step in FIG. 7.

FIG. 8 is a schematic diagram which is useful in explaining the photographing object-tracking process in the step S702, and shows frame 1 to frame 5 as image data items which have been sequentially acquired for the luminance change-based flicker detection. By calculating a correlation of the photographing object appearing in the image data between each two successive frames, it is possible to track the photographing object between the frames. By tracking the photographing object between frames, it is possible to detect whether or not the photographing object appears in the luminance evaluation value acquisition area 103A set in the image pickup device 103, and further, detect a range of area in which the photographing object appears. Therefore, the result of the photographing object-tracking process is used as a condition for determining whether or not the luminance change-based flicker detection calculation can be performed.

Note that it is also preferable to increase the accuracy of the photographing object-tracking process by executing, as the photographing object-tracking process, a color tracking process for tracking a photographing object by determining the color of the photographing object, a human body-tracking process for tracking a photographing object by determining whether or not the photographing object is a human body, or the like. Further, by performing the above-described photographing object-tracking process, it is possible to determine whether or not a photographing object which is an object included in the image is moving. Therefore, whether or not there is a photographing object to be tracked is equivalent to whether or not a photographing object which is an object included in the image is moving.

Next, in a step S703, the CPU 101 determines based on a result of the photographing object-tracking process in the step S702 whether or not the luminance change-based flicker detection calculation can be performed, depending on whether or not there is a photographing object to be tracked. If there is no photographing object to be tracked, i.e. if there is no photographing object which changes the luminance of the screen (NO to the step S703), the CPU 101 proceeds to a step S704. On the other hand, if there is a photographing object to be tracked, i.e. if a photographing object appearing in the luminance evaluation value acquisition area 103A influences a change in the luminance of the screen (YES to the step S703), the CPU 101 proceeds to a step S705.

In the step S704, the CPU 101 selects the luminance change-based flicker detection calculation, and performs the luminance change-based flicker detection calculation using the image data acquired in the step S701. The details of arithmetic processing for the luminance change-based flicker detection calculation are the same as those in the step S204 in FIG. 2, and hence description thereof is omitted. The CPU 101 proceeds to a step S707 after execution of the step S704.

In the step S705, the CPU 101 drives the image pickup device 103 in the driving mode for the in-screen mapping-based flicker detection, and acquires mapping data. Then, in a step S706, the CPU 101 performs the flicker detection calculation using the in-screen mapping data acquired in the step S705. The details of processing in the steps S705 and S706 are the same as those in the steps S205 and S206 in FIG. 2, and hence description thereof is omitted. The CPU 101 proceeds to the step S707 after execution of the step S706.

In the step S707, the CPU 101 determines the presence or absence of flicker. That is, since one of a result of the luminance change-based flicker detection calculation in the step S704 and a result of the in-screen mapping-based flicker detection calculation result in the step S706 has been obtained, the CPU 101 determines the presence or absence of flicker in the photographing environment of the digital camera 100 based on the obtained result of the flicker detection calculation.

As described above, also in the second flicker detection process performed by the digital camera 100, it is possible to calculate a light amount change characteristic of light from an object according to a state of the object by selectively using one of the flicker detection methods, which is suitable for the photographing environment, while realizing high-speed flicker detection.

Next, a description will be given of the third flicker detection process performed by the digital camera 100. It is assumed that a display device, not shown, such as a liquid crystal panel, is provided in a rear side of the camera body 100A of the digital camera 100 shown in FIG. 1. In a case where a live view function for sequentially displaying image data items sequentially acquired by the image pickup device 103 on the display device is executed under a flickering light source, a live view image having exposure unevenness due to flicker is sometimes displayed on the display device.

To solve this problem, in the third flicker detection process, whether or not the photographing environment is under a flickering light source is determined before executing the live view function, and a program chart to be used by the digital camera 100 is determined based on a result of the determination. This makes it possible to provide a live view image without exposure unevenness due to flicker to the user.

Note that, as described hereinabove, since the image sensor (image pickup device), such as a CCD sensor or a CMOS sensor, is used as the photometric sensor 108, it is possible to perform luminance detection, photographing object tracking, face detection, and so forth, using data (image data) acquired by the photometric sensor 108. Further, the number of pixels of the photometric sensor 108 is less than that of the image pickup device 103, and hence it is easy to perform high-speed readout of image data, which is a requirement for executing the luminance change-based flicker detection. For this reason, the photometric sensor 108 is used for the luminance change-based flicker detection in the third flicker detection process.

Figure 9:
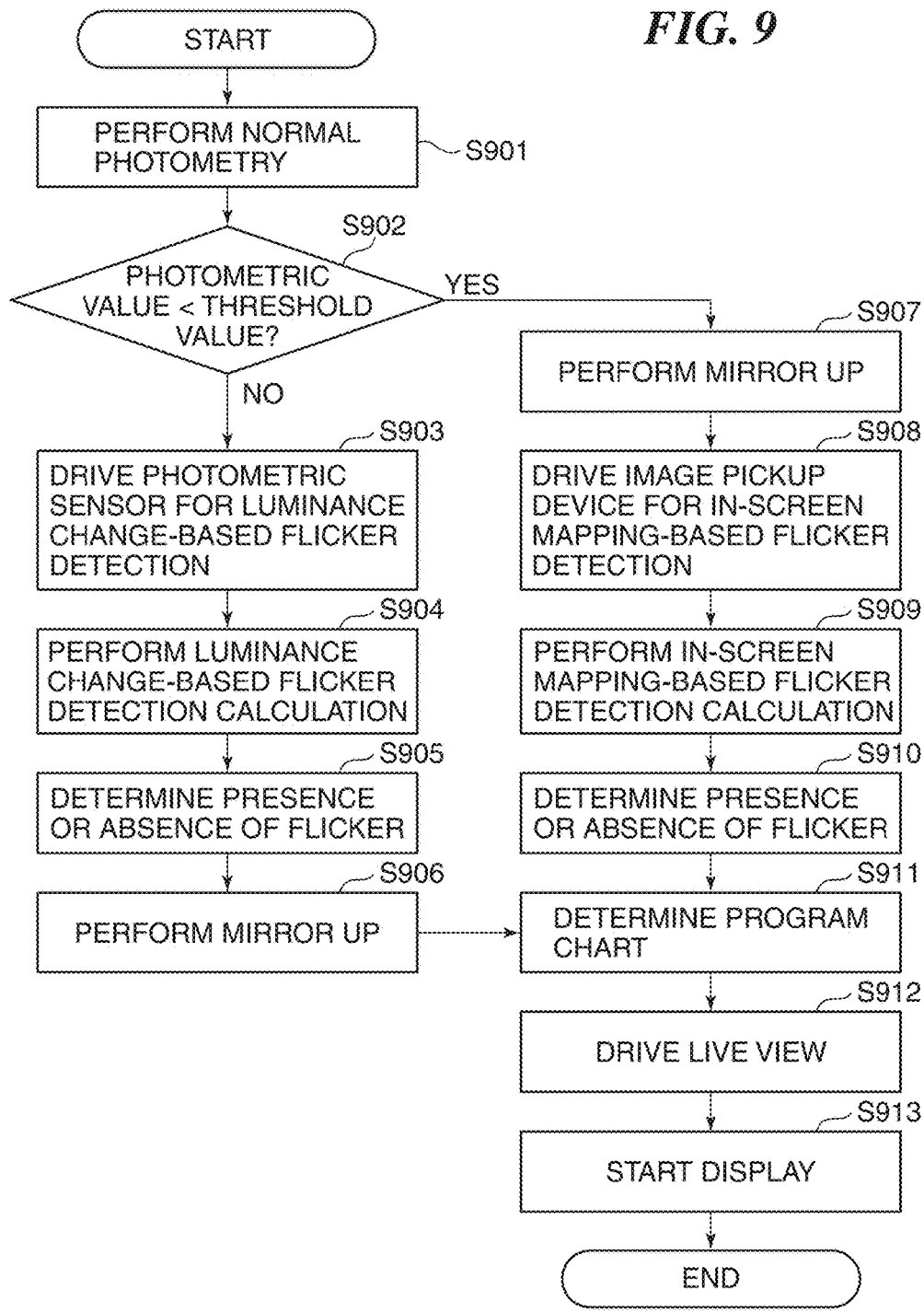
FIG. 9 is a flowchart of a third flicker detection process performed by the digital camera.

FIG. 9 is a flowchart of the third flicker detection process performed by the digital camera 100. The processing steps in FIG. 9 are realized by the CPU 101 that controls the operations of the components of the digital camera 100 by loading programs stored in the ROM of the memory 102 into the RAM. Note that the third flicker detection process shown in FIG. 7 includes processing practically performed by the ICPU 112 under the control of the CPU 101, and such processing will be described as processing executed by the ICPU 112.

When an instruction for executing the live view is given to the digital camera 100 by a user, the ICPU 112 under the control of the CPU 101 performs, in a step S901, an operation of normal photometry using the photometric sensor 108 to thereby detect the brightness of the photographing environment. A result of the detection in the step S901 is used to determine whether or not flicker detection can be performed.

Further, the result of the detection in the step S901 is used as a reference brightness at the start of image pickup performed by the image pickup device 103, for picking up image data for live view. A reason for this is as follows: After the live view has been started, exposure is determined by calculating photometric values from image data acquired by the image pickup device 103, but a brightness at the start of the live view is required to be acquired from the outside as information. In a case where photometry is performed using image data obtained from the image pickup device 103, a range of the brightness which can be measured using an image data item obtained by one photographing operation is narrower than a range of the brightness which can be measured by the photometric sensor 108 which is a dedicated photometric sensor. Therefore, to determine a brightness at the start of live view by measuring a wide range of brightness using the image pickup device 103, it is necessary to perform photometry by acquiring image data a plurality of times, which delays the start of live view. Further, if a brightness at the start of live view is erroneously determined, a change in display from an image including blown-out highlights and black level depression to an image at a proper brightness is shown to the user, which degrades the display quality. To solve these problems, it is desirable to measure the brightness at the start of live view using the photometric sensor 108.

In the following step S902, the CPU 101 compares the photometric value obtained in the step S901 with a predetermined threshold value, and determines whether or not the photometric value is smaller than the predetermined threshold value. The details of processing in the step S902 are the same as those in the step S202 in FIG. 2, and hence detailed description thereof is omitted. If the photometric value is not smaller than the threshold value (NO to the step S902), the CPU 101 proceeds to a step S903, whereas if the photometric value is smaller than the threshold value (YES to the step S902), the CPU 101 proceeds to a step S907.

In the step S903, the ICPU 112 under the control of the CPU 101 drives the photometric sensor 108 in the driving mode for the luminance change-based flicker detection. Then, in a step S904, the ICPU 112 performs the flicker detection calculation, and notifies the CPU 101 of a result of the calculation. In the following step S905, the CPU 101 determines the presence or absence of flicker. The determination in the step S905 results in one of absence of flicker, presence of flicker (power supply: 50 Hz), and presence of flicker (power supply: 60 Hz).

Here, in the third flicker detection process, a program chart to be used when executing the live view is determined based on a result of the determination of the presence or absence of flicker, and in doing this, the photometric value measured in the step S901 is required. Therefore, in the step S904, the ICPU 112 notifies the CPU 101 of the photometric value measured in the step S901 together with a result of the flicker detection calculation. The details of processing in the steps S903 and S904 are the same as those in the steps S203 and S204 in FIG. 2, and hence description thereof is omitted.

In the third flicker detection process, the ICPU 112 is configured to perform flicker detection calculation, but not to perform determination of the presence or absence of flicker. This is not limitative, but the ICPU 112 may be configured to perform determination of the presence or absence of flicker, and notify the CPU 101 of a result of the determination together with the photometric value measured in the step S901.

Next, in a step S906, the CPU 101 performs a mirror-up operation to start the live view operation and opens the shutter 104 to thereby form an image of light incident through the lens barrel 100B on the image pickup device 103. After that, the CPU 101 proceeds to a step S911.

In the step S907 and steps 908 to S910 which are to be executed next in a case where the answer to the question of the step S902 is affirmative (YES), the CPU 101 performs the in-screen mapping-based flicker detection using the image pickup device 103. In the step S907, the CPU 101 performs the mirror-up operation and opens the shutter 104 to thereby form an image of light incident through the lens barrel 100B on the image pickup device 103. Note that in the step S907, the luminance change-based flicker detection by the ICPU 112 is not performed, and hence the ICPU 112 notifies the CPU 101 that occurrence of flicker is unknown.

In the step S908, the CPU 101 drives the image pickup device 103 in the driving mode for the in-screen mapping-based flicker detection, and acquires mapping data. Then, in the step S909, the CPU 101 performs the flicker detection calculation using the mapping data acquired in the step S908. The details of processing in the steps S908 and S909 are the same as those in the steps S205 and S206 in FIG. 2, and hence description thereof is omitted.

Then, in the step S910, the CPU 101 determines the presence or absence of flicker based on a result of the calculation in the step S909. The determination in the step S910 results in one of absence of flicker, presence of flicker (power supply: 50 Hz), and presence of flicker (power supply: 60 Hz), similar to the result of the determination in the step S905. After performing the determination in the step S910, the process proceeds to the step S911.

In the step S911, the CPU 101 determines a program chart to be used for live view based on the result of the determination in the step S905 or S910. In the present example, as the program chart to be used for live view, there are provided two program charts: a normal program chart and a flicker elimination program chart which does not use a shutter speed on a short shutter time side so as to prevent flicker from being displayed, and one of the two charts is used. Note that the program charts are stored in the ROM of the memory 102.

By executing the step S911, the brightness at the start of live view and the program chart to be used for the live view operation are determined, and hence in a step S912, the CPU 101 sequentially acquires image data items using the image pickup device 103, and performs the live view operation. Accordingly, in a step S913, the CPU 101 displays the image data acquired by the image pickup device 103 on the display device, which completes an operation for starting the live view.

As described above, in the third flicker detection process performed by the digital camera 100, before executing live view, the high-speed luminance change-based flicker detection is performed using the photometric sensor 108, and when flicker detection is to be performed using the image pickup device 103, the in-screen mapping-based flicker detection is performed. This makes it possible to calculate a light amount change characteristic of light from an object according to a state of the object. Further, it is possible to reduce a time period from issuance of an instruction of the start of live view to display of a live view image on the display device, and in doing this, it is possible to prevent the live view image having exposure unevenness due to flicker from being displayed on the display device.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Further, it is possible to combine the configurations described above on an as needed basis. For example, although in the above-described embodiment, the ICPU 112 is provided which is a CPU dedicated to the photometric sensor 108, the CPU 101 may perform the driving control, image processing, and arithmetic processing for the photometric sensor 108.

Further, the first and second flicker detection processes may be combined. Furthermore, although in the first and second flicker detection processes, the luminance change-based flicker detection and the in-screen mapping-based flicker detection are performed using the image pickup device 103, the luminance change-based flicker detection and the in-screen mapping-based flicker detection may be performed using the photometric sensor 108.

Further, also in the first and second flicker detection processes, similar to the third flicker detection process, the luminance change-based flicker detection may be performed using the photometric sensor 108, and the in-screen mapping-based flicker detection may be performed using the image pickup device 103.

Although in the above-described first to third flicker detection processes, the luminance change-based flicker detection is performed using the photometric sensor 108 formed by a photoelectric conversion device, such as a CCD sensor or a CMOS sensor, in the luminance change-based flicker detection, any other sensor may be used insofar as it is capable of acquiring a photometric value even if not image data. Therefore, as the photometric sensor 108, a known photometric sensor, which is not a photoelectric conversion device, such as a CCD sensor or a CMOS sensor, may be provided.

Further, the first and second flicker detection processes can be performed by an electronic apparatus even if the electronic apparatus is not equipped with an image pickup function insofar as it has a function of calculating a light amount change characteristic of light from an object. For example, in a case where a communication apparatus capable of communicating with an image pickup apparatus is equipped with a function of calculating a light amount change characteristic of light from an object, a result of the calculation may be transmitted from the communication apparatus to the image pickup apparatus, for use in image pickup performed by the image pickup apparatus. Further, in a case where a photometric device is equipped with a function of calculating alight amount change characteristic of light from an object, a user may confirm a result of the calculation, and cause the result of the calculation to be reflected on the operation of the image pickup apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2015-031506 filed Feb. 20, 2015, which is hereby incorporated by reference herein in its entirety.

What is claimed is:

1. An electronic apparatus comprising:
   one or more processors connected to one or more memories, the one or more processors configured to:
   perform a first calculation of a light amount change characteristic of light from an object based on a plurality of photometric values obtained at intervals of a time period shorter than a predetermined time period;
   perform a second calculation of the light amount change characteristic based on information on luminance changes within an image, which information is obtained by performing charge accumulation for each of areas such that start timing thereof is differentiated on an area-by-area basis, over a charge accumulation time period longer than the time period for obtaining each of the plurality of photometric values; and
   control whether to calculate the light amount change characteristic using said first calculation or calculate the light amount change characteristic using said second calculation according to a state of the object.

2. The electronic apparatus according to claim 1, wherein said first calculation and said second calculation calculate a light amount change repetition period of light from the object as the light amount change characteristic.

3. The electronic apparatus according to claim 1, wherein said first calculation and said second calculation calculate timing at which an amount of light from the object, which periodically changes, becomes a maximum value, as the light amount change characteristic.

4. The electronic apparatus according to claim 1, the one or more processors further configured to obtain each photometric value, the electronic apparatus further comprising:
   an image pickup for obtaining the image.

5. The electronic apparatus according to claim 1, comprising an image pickup for obtaining the image, and
   wherein said image pickup is also used to obtain each photometric value.

6. The electronic apparatus according to claim 1, wherein the predetermined time period is $1/120$ seconds.

7. The electronic apparatus according to claim 1, the one or more processors further configured to perform control such that the light amount change characteristic is calculated using said first calculation in a case where the brightness of the object is not lower than a predetermined threshold value, and the light amount change characteristic is calculated using said second calculation in a case where the brightness of the object is lower than the predetermined threshold value.

8. The electronic apparatus according to claim 1, the one or more processors further configured to detect movement of an object within the image, and perform control such that the light amount change characteristic is calculated using said first calculation in a case where the object is not moving, and the light amount change characteristic is calculated using said second calculation in a case where the object is moving.

9. A method of calculating a light amount change characteristic, comprising:
   calculating a light amount change characteristic of light from an object based on a plurality of photometric values obtained at intervals of a time period shorter than a predetermined time period;
   calculating the light amount change characteristic based on information on luminance changes within an image, which information is obtained by performing charge accumulation for each of areas such that start timing thereof is differentiated on an area-by-area basis, over a charge accumulation time period longer than the time period for obtaining each of the plurality of photometric values; and
   controlling whether to calculate the light amount change characteristic by said first-mentioned calculating or calculate the light amount change characteristic by said second-mentioned calculating according to a state of the object.

* * * * *